United States Patent [19]

Demircan et al.

[11] Patent Number: 4,485,724
[45] Date of Patent: Dec. 4, 1984

[54] HYDRAULIC CONTROL APPARATUS

[75] Inventors: Bayramadi Demircan, Bergkamen; Willy Kussel, Werne, both of Fed. Rep. of Germany

[73] Assignee: Gewerkschaft Eisenhutte Westfalia, Lunen, Fed. Rep. of Germany

[21] Appl. No.: 392,352

[22] Filed: Jun. 25, 1982

[30] Foreign Application Priority Data

Jul. 17, 1981 [DE] Fed. Rep. of Germany ....... 3128279

[51] Int. Cl.$^3$ ................................................. F15B 9/08
[52] U.S. Cl. .................................... 91/29; 91/170 MP; 91/453; 91/518
[58] Field of Search ................ 91/170 MP, 29, 453, 91/28, 518; 251/63.4, 63.6, 82, 83

[56] References Cited

U.S. PATENT DOCUMENTS 4,076,210 2/1978 Spielvogel ........................ 251/63.4
4,391,181 7/1983 Weirich et al. ........................ 91/29

Primary Examiner—Robert E. Garrett
Assistant Examiner—John M. Husar
Attorney, Agent, or Firm—Thompson, Birch

[57] ABSTRACT

Hydraulic control apparatus serves to operate roof support props of a mineral mining installation. An automatic setting arrangement with a valve device ensures the props become set against the roof with a high uniform force by connecting a prop pressure chamber to a pressure fluid source once a threshold pressure is exceeded signifying the prop has been extended. To disable the automatic setting arrangement during prop retraction the valve device thereof is provided with a control piston which is subjected to pressure during retraction to oppose the action of another control piston which responds to the threshold pressure.

14 Claims, 2 Drawing Figures

HYDRAULIC CONTROL APPARATUS

BACKGROUND TO THE INVENTION

The present invention relates to hydraulic control apparatus for operating the support props of a mineral mining installation.

Known forms of control apparatus of the type with which the invention is concerned are described in German Patent Specifications P 27 49 312 and P 29 14 884. These apparatuses utilize manual-operable control valve devices which connect pressure fluid feed and return lines selectively to the working chambers of associated props. An automatic setting arrangement composed of further valve devices is designed to connect the prop chambers charged with fluid to extend the props to a pressure fluid source or to the pressure line once a threshold pressure is exceeded. The automatic setting arrangement acts independently of the control valve devices and ensures that a prop is adequately set against the roof even if one of the control valve devices is operated prematurely to disconnect the pressure source from the prop chamber. The threshold pressure at which the automatic setting arrangement comes into operation is made higher than that present in the prop chamber when the prop is being extended freely without contact with the roof and less than the desired setting pressure and that provided in the pressure feed line. In general, the props can be extended and retracted by operation of the control valve device(s) without the automatic setting arrangement coming into operation. This enables repairs and maintenance work and any back filling necessary in the event of roof falls to be performed without the automatic setting arrangement becoming affected. Generally, the threshold pressure at which the setting arrangement comes into operation is in the range 50 bars to 150 bars, e.g. 120 bars, while the pressure in the pressure feed line is significantly higher—typically above 300 bars and more usually in the range 350-450 bars.

One problem encountered with the known apparatuses, occurs when the props are subjected to pressure fluid to cause their retraction. During this operation pressure fluid in the working chambers of the props charged to produce their extension needs to pass back to the return line and it is possible that temporary fluctuations in the pressure in these chambers, caused by back pressure, could exceed the threshold pressure of the automatic setting system. In this event the retraction of the props will be prevented or hindered since the pressure source would be connected to the working chambers of the props instead of the return line.

A general object of the present invention is to provide an improved form of control apparatus.

SUMMARY OF THE INVENTION

The present invention relates to control apparatus comprising pressure fluid feed and return lines, at least one manually-operable control valve device for selectively connecting said feed and return lines to respective working chambers of a support prop and automatic setting means for automatically connecting the one working chamber of the prop which is charged with pressure fluid to effect extension of the prop to a source of pressure fluid when a predetermined threshold pressure in said one chamber is exceeded, said threshold pressure being lower than a desired setting pressure and higher than that which prevails in said one chamber which the prop is being extended.

In accordance with the invention means is provided for automatically disabling the automatic setting means when the control valve device connects the other working chamber of the prop to the pressure fluid feed line to effect prop retraction. This avoids the problems discussed hereinbefore when the automatic setting arrangement or means could inadvertently come into operation during prop retraction. Indeed with apparatus constructed in accordance with the invention a pressure head can build up in the first-mentioned working chamber during retraction which is above the threshold pressure of the setting means without the latter responding. The disabling means can take the form of a hydraulically operated valve which switches over when pressure fluid is passed to the other prop working chamber. This valve may constitute at least part of the automatic setting means.

Further non-return valves and at least one relief valve would normally be incorporated in the apparatus. Conveniently, the control valve device is connected to said one working chamber of the prop via a line incorporating a non-return valve and to said other working chamber via another line. A pressure-relief valve is connected between said lines and on the side of the non-return valve remote from the control valve device to relieve excessive pressure in the one working chamber. This non-return valve is then controlled hydraulically to open automatically when the line connected to the other working chamber is pressurized to effect prop retraction.

In one preferred construction the automatic setting means takes the form of a simple setting valve device which has a control piston designed to change its operating state once the threshold pressure is exceeded. This valve device can then adopt a state where connection is established therethrough between the source of pressure fluid, which may be the pressure fluid feed line, and the first-mentioned working chamber. The disabling means can then take the form of another control piston for the valve device which opposes the action of the first-mentioned control piston. This other control piston can be exposed to pressure in a line leading to the other prop working chamber to prevail over the first-mentioned control piston and cause the valve device to adopt a state where connection therethrough is blocked. The respective control pistons can be connected via conduits or lines to the prop working chambers. The piston may have differential working areas and/or supplementary spring force can cause the other control to prevail as aforesaid.

The invention also extends to a compact valve device with a housing containing a valve element, such as a ball, held against a seating by spring force to block connection between inlet and outlet ports leading to the prop working chamber used for extension and setting and to the pressure fluid source. Opposed control pistons having plungers can then act on the element in opposite senses. One control piston is supplemented by the spring force and is subjected to pressure when the other prop working chamber is likewise pressurized for retraction. The other control piston is subjected to pressure when the working chamber used for extension is charged and serves to lift the valve element off its seating against the spring force once the threshold pressure for automatic setting is exceeded. If both pistons are subjected to pressure of similar value the one piston prevails because of the spring force but this effect can be exhanced by making the working area of this one piston greater than that of the other piston.

A preferred embodiment of apparatus constructed in accordance with the invention comprises main pressure fluid feed and return lines; a manually-operable control valve device for selectively connecting the feed and return lines to respective first and second working chambers of the prop to effect extension and retraction thereof; a setting valve device connected to the first working chamber of the prop which is charged with fluid to effect extension of the prop; said setting valve device being settable to a first state where connection is established therethrough between said first working chamber and a pressure fluid source or a second state where connection is broken between said source and said first working chamber; a first control piston of the setting valve device connected to said first working chamber for causing the valve device to adopt said first state when exposed to pressure above a threshold signifying the prop is being set; a second control piston of the setting valve device connected to the second working chamber of the prop for opposing the action of the first control piston and for causing the setting valve device to adopt said second state when the second working chamber is charged with fluid to effect retraction of the prop.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawing, wherein.

DESCRIPTION OF PREFERRED EMBODIMENTS

Figure 1:
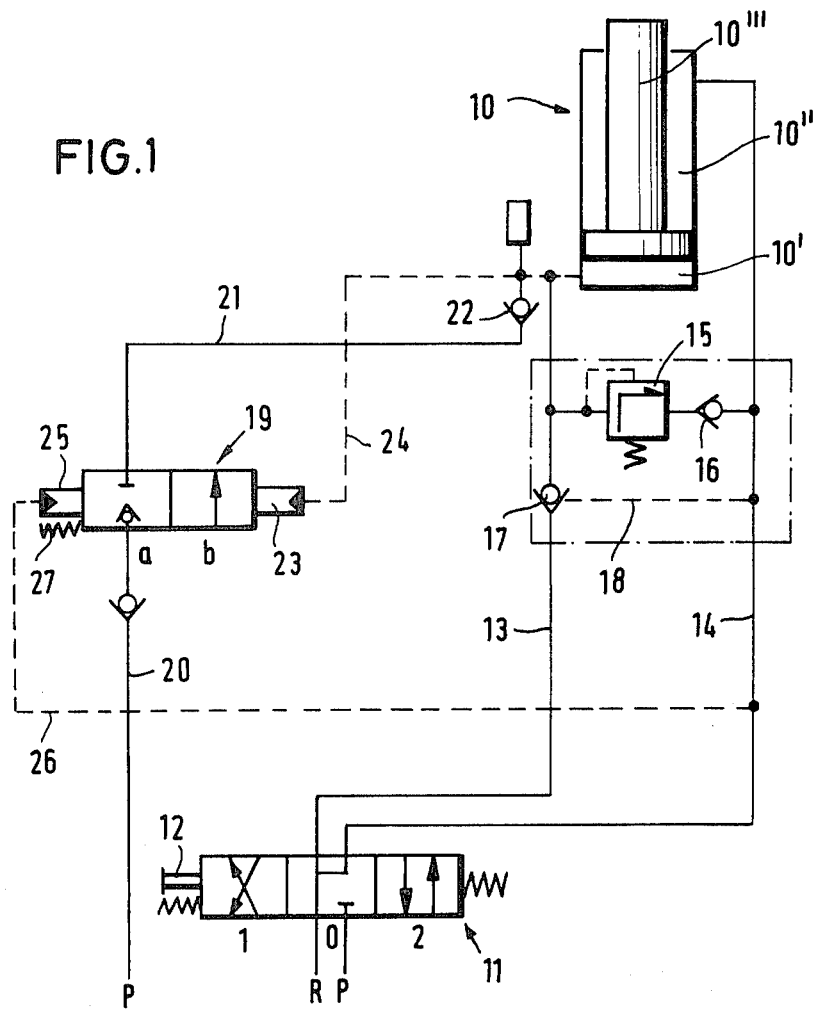
FIG. 1 is a schematic representation of hydraulic control apparatus constructed in accordance with the invention and FIG. 2 is a sectional view of a valve device for use in the apparatus shown in FIG. 1.

As shown in FIG. 1, control apparatus constructed in accordance with the invention has a valve device 11 connected by way of example through conduits or lines 13, 14 to the working chambers 10', 10" of a hydraulic prop 10 and to pressure fluid feed and return lines P.R. It is also possible to connect the valve device 11 to several props instead of a single prop as shown. The valve device 11 is capable of adopting one of three settings or states 0, 1, 2 depicted schematically by reference numerals in FIG. 1. The valve device 11 can employ a rotary slide valve actuated by a pivotable control lever 12 accessible from the exterior of a housing. The valve device 11 is provided with an automatic return mechanism—the so-called "dead man's handle"—which automatically brings the valve device 11 back into a neutral position 0 when the lever 12 is released. This neutral position 0 effectively blocks off the working chambers 10', 10" of the prop 10 from the pressure line P. In the state 0 as illustrated, the chamber 10" of the prop 10 is connected via the line 14 and the valve device 11 to the return line R. The chamber 10' is also connected to the return line via the line 13 and the valve device 11 but the presence of a non-return valve 17 maintains the prop properly set. If the valve device 11 is changed over to the state designated 1 the chamber 10' is connected to the pressure feed line P via the non-return valve 17, the line 13 and the valve device 11 which the chamber 10" is connected to the return line via the line 14 and the valve device 11. This setting state 1 thus initiates extension and then setting of the prop 10. With the valve device 11 set to the control state designated 2 the chamber 10' is connected to the return line R via the line 13 and the valve device 11 while the chamber 10" is connected to the pressure feed line P via the line 14 and the valve device 11. The non-return valve 17 is subjected to hydraulic control as indicated by the chain-dotted hydraulic control line 18. This line 18 connects the valve 17 to the line 14 so that the valve 17 is held open when the valve device 11 is set to the state 2 and the line 14 is thus connected to the pressure line P. This setting state 2 initiates positive retraction of the prop 1.

A pressure relief valve 15 of known construction is connected between the lines 13 and 14 on the side of the valve 17 feeding the chamber 10'. The valve device 15 is set to open at a predetermined excess pressure to thereby connect the prop chamber 10' directly to the line 14 and thence to the return line R should excessively higher pressure prevail in the chamber 10' with the valve device 11 in states 0 or 1. The valve device 15 is connected to the line 14 via a non-return valve 16.

The apparatus employs automatic setting means which includes a further valve device 19. This setting valve device 19 is connected via a line to the pressure line P as shown or to another source of pressure fluid possibly provided by the same pump as line P. A non-return valve is incorporated in the line 20. The valve device 19 is connected via a line 21 and a non-return valve 22 to the working chamber 10' of the prop 10. The valve device 19 is capable of adopting two operating conditions or states designated a and b in the drawing. In state a, connection between the lines 20, 21 is blocked while in state b, connection is established between the lines 20, 21. The valve device 19 is controlled hydraulically by means of pistons 23, 25. The piston 23 is connected via a hydraulic control line 24 to the working chamber 10' and the piston 25, which operates in opposition to the piston 23, is connected via a hydraulic control line 26 to the line 14. The action of the piston 25 is supplemented by the force of a closure spring 27.

As mentioned previously, in order to set the prop 10 the valve device 11 is changed into the state 1 so that the line 13 connects the chamber 10' to the pressure feed line P while the line 14 connects the chamber 10" to the return line R. As the piston 10'" of the prop 10 moves outwardly of its cylinder to raise the prop, the pressure in the chamber 10' remains more or less constant at about 50 bars or less. When the roof-engaging structure borne by the prop 10 makes contact with the roof of the mine working, however, the pressure builds up in the chamber 10' provided that the valve device 11 remains in the state 1. If the device 11 is prematurely changed to state 0 the pressure prevailing in the chamber 10' may be considerably lower than that considered to be safe for adequate setting. The automatic setting system shown in FIG. 1 is designed to overcome this problem and comes into operation at a certain pre-selected pressure above 50 bars and usually in the range 50–150 bars or more preferably 100–130 bars. Once the lower threshold limit set by the automatic setting system is exceeded by the pressure in the chamber 10' thus signifying the onset of setting, this pressure acts via the line 24 on the piston 23 to change the state of the valve device 19 from state a to state b. As a result the chamber 10' is now connected to the pressure line P by way of the device 19. Thus the valve device 11 is by-passed and the prop 10 can be adequately set. In order to retract the prop 10, the valve device 11 is changed to the state 2 in which the line 13 is connected to the return line R via the opened valve 17 while the line 14 is connected to the pressure line P. In this condition, the chamber 10" of the prop is subjected to hydraulic pressure while the chamber 10' is relieved and the piston 10''' of the prop 10 is retracted. The pressure fluid in the chamber 10' is driven out via the line 13 and the non-return valve 17, which is actuated by the control line 18 and vents through the valve device 11. Any back pressure or pressure head which exceeds the setting pressure of the valve device 19 and which may build up in the line 13 leading to the return line R would force the valve device 19 to switch over to position b to connect the chamber 10' with the pressure line P. This would then inhibit the desired retraction of the prop 10. In order to eliminate this problem the valve device 19 has its piston 25 connected to the line 14 via the line 26 so that during retraction when the line 14 is subjected to pressure, the valve device 19 is held in state a. The control piston 25 in conjunction with the spring 27 is thus capable of exerting a greater force than the control piston 23 even if back pressure builds up in the line 13 during prop retraction.

Figure 2:
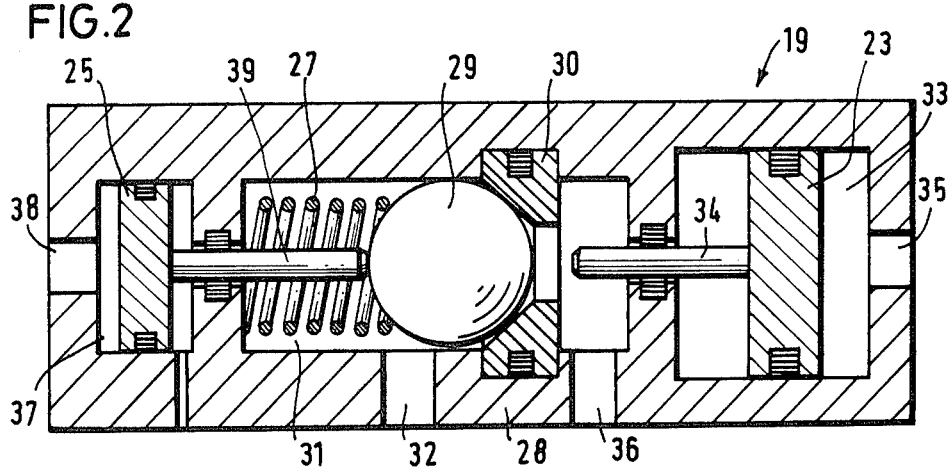

FIG. 2 shows a preferred constructional arrangement for the valve device 19. As shown, the valve device 19 has a housing or block 28 containing a valve closure element in the form of a ball 29 which is urged against a seating 30 by the closure spring 27. A chamber 31 in the housing 28 contains the spring 27 and the closure element 29 and a port or opening 32 leads out from the chamber 31 to permit connection with the line 20. This port 32 thus forms an inlet to the valve device 19. Another chamber 37 contains the control piston 25 which acts on the valve closure element 29 via a guided push rod passing through the spring 27 to urge the element 29 against the seating 30 (state a FIG. 1). A port 38 leads to the chamber 37 and permits connection with the line 26. At the opposite end and in a somewhat larger chamber 33 the piston 23 is provided. The piston 23 has a push rod 34 capable of acting on the valve closure element 29 to lift the element 29 off its seating 30 (state b FIG. 1). Access to the chamber 33 is provided by a port 35 which would be connected to the line 24. A further port 36 leads to a chamber next to the seating 30 and acts as an outlet from the device 19. The port 36 would be connected to the pressure line 21. It can be seen that the valve element 29 is held on its seating 30 to block connection between the ports 32, 36 by the force of the spring 27 and by pressure which may prevail in the line leading to the port 38 to act on the piston 25. The valve closure element 29 can however be raised off its seating to thereby open connection between the ports 32, 36 by means of pressure acting on the piston 23 via the port 35.

When the device 11 is set to state 2 to retract the prop 10 the pressure in the line 14 acts via the line 26 on the piston 25 to supplement the force of the spring 27 thereby to overcome the force exerted by the piston 23 to ensure that the valve closure element 29 is held on the seating 30 to close the connection between the ports 32, 36 thereby to bring the valve device to the state a.

We claim:

1. In hydraulic control apparatus for operating support props of a mineral mining installation; said apparatus comprising pressure fluid feed and return lines, at least one manually-operable control valve device for selectively connecting said feed and return lines to respective working chambers of a support prop and automatic setting means for automatically connecting one working chamber of the prop which is charged with pressure fluid to effect extension of the prop to a source of pressure fluid when a predetermined threshold pressure in said one chamber is exceeded, said threshold pressure being lower than a desired setting pressure and higher than that which prevails in said one chamber while the prop is being extended; the improvement comprising fluid actuated means responsive to the fluid pressure in said feed line for automatically disabling the automatic setting means when the control valve device connects the other working chamber of the prop to said feed line to effect prop retraction.

2. Apparatus according to claim 1, wherein the fluid actuated means takes the form of a hydraulically operated valve which changes state automatically when the pressure fluid feed line is connected to the other working chamber.

3. Apparatus according to claim 2, wherein said valve constitutes at least part of the automatic setting means.

4. Apparatus according to claim 1, wherein the automatic setting means at least includes a setting valve device which has a control piston which actuates the valve device to establish connection therethrough between said one working chamber and the pressure source once the threshold pressure is exceeded and wherein the disabling means comprises another control piston for the setting valve device which opposes the action of the first-mentioned control piston.

5. Apparatus according to claim 4, wherein the other control piston is connected to a line leading to the other prop working chamber and prevails over the first-mentioned control piston when pressure fluid passes to said other chamber to cause the valve device to adopt a state where connection therethrough is blocked.

6. Apparatus according to claim 5, wherein the other control piston has a smaller working area than the first-mentioned control piston.

7. Apparatus according to claim 5, wherein spring force opposes the action of the first-mentioned control piston.

8. Apparatus according to claim 4, wherein the control pistons are connected via lines to the respective working chambers of the prop.

9. Apparatus according to claim 1, wherein the control valve device is connected to said one working chamber of the prop via a line incorporating a non-return valve and to said other working chamber via another line and a pressure-relief valve is connected between said lines and on the side of the non-return valve remote from the control valve device to relieve excessive pressure in the one working chamber.

10. Apparatus according to claim 9, wherein the non-return valve is controlled hydraulically to open automatically when the line connected to the other working chamber is pressurized to effect prop retraction.

11. Hydraulic control apparatus for controlling a pressure fluid operated roof support prop of mining apparatus; said apparatus comprising main pressure fluid feed and return lines; a manually-operable control valve device for selectively connecting the feed and return lines to respective first and second working chambers of the prop to effect extension and retraction thereof; a setting valve device connected to the first working chamber of the prop which is charged with fluid to effect extension of the prop; said setting valve device being settable to a first state where connection is established therethrough between said first working chamber and a pressure fluid source or a second state where connection is broken between said source and said first working chamber; a first control piston of the setting valve device connected to said first working chamber for causing the valve device to adopt said first state when exposed to pressure above a threshold signifying the prop is being set; a second control piston of the setting valve device connected to the second working chamber of the prop for opposing the action of the first control piston and for causing the setting valve device to adopt said second state when the second working chamber is charged with fluid to effect retraction of the prop.

12. For use in hydraulic control apparatus for operating support props of a mineral mining installation; said apparatus comprising pressure fluid feed and return lines, at least one manually-operable control valve device for selectively connecting said feed and return lines to respective first and second working chambers of a support prop to effect extension and retraction thereof; a setting valve device comprising a housing with inlet and outlet ports connected to the first working chamber of the prop which is charged with pressure fluid to effect extension of the prop and to a source of pressure fluid; a valve element which can adopt a first state where connection is established between the inlet and outlet ports or a second state where connection is broken between the inlet and outlet ports; a first control piston in a chamber of the housing connected to the first working chamber of the prop for causing the valve element to adopt said first state when exposed to pressure above a threshold signifying the prop is being set and a second control piston in a chamber of the housing connected to the second working chamber of the prop for causing the valve element to adopt its second state when exposed to pressure signifying prop retraction; the second control piston serving to prevail over the first control piston if both pistons are subjected to the same pressure.

13. A valve device according to claim 12, wherein the valve element is a ball engageable on a valve seating, the first and second pistons act on said ball in opposed directions by way of push rods and wherein a spring serves to bias the ball on the seating to maintain the valve element in the second state unless the first piston only is exposed to pressure above said threshold.

14. A valve device according to claim 12, wherein the second piston has a smaller working area than the first piston.

* * * * *